United States Patent
Itoh et al.

(10) Patent No.: US 12,405,608 B2
(45) Date of Patent: Sep. 2, 2025

(54) VEHICLE TRANSPORTATION SYSTEM, VEHICLE TRANSPORTATION METHOD, AND STORAGE MEDIUM

(71) Applicant: TOYOTA JIDOSHA KABUSHIKI KAISHA, Aichi-ken (JP)

(72) Inventors: Masayuki Itoh, Nagoya (JP); Iwao Maeda, Nagoya (JP); Tatsuya Sugano, Susono (JP); Norinao Watanabe, Susono (JP); Yutaka Nakamura, Susono (JP); Yoshikazu Jikuhara, Susono (JP); Yuki Nishikawa, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 301 days.

(21) Appl. No.: 18/177,080

(22) Filed: Mar. 1, 2023

(65) Prior Publication Data
US 2023/0376028 A1 Nov. 23, 2023

(30) Foreign Application Priority Data
May 19, 2022 (JP) .................. 2022-082224

(51) Int. Cl.
*G05D 1/00* (2024.01)
*B60W 60/00* (2020.01)

(52) U.S. Cl.
CPC ......... *G05D 1/0022* (2013.01); *B60W 60/001* (2020.02); *B60W 2556/45* (2020.02)

(58) Field of Classification Search
CPC .. G05D 1/0022; G05D 1/227; G05D 2105/22; G05D 2107/13; G05D 2109/10; B60W 60/001; B60W 60/007; B60W 2556/45; B60P 3/07; E04H 6/06; E04H 6/12; E04H 6/422; B60S 13/02; H04L 67/025
See application file for complete search history.

(56) References Cited

U.S. PATENT DOCUMENTS

| | | | |
|---|---|---|---|
| 5,295,551 A * | 3/1994 | Sukonick | B62D 1/28 180/167 |
| 12,054,195 B2 * | 8/2024 | Weston | B62D 15/0265 |
| 2016/0106023 A1 * | 4/2016 | Roy | A01B 69/004 701/2 |
| 2017/0009408 A1 * | 1/2017 | Marsolek | E01C 23/065 |
| 2019/0054920 A1 * | 2/2019 | Karlsson | H04W 4/46 |
| 2020/0398803 A1 * | 12/2020 | Oba | B60T 8/1708 |

FOREIGN PATENT DOCUMENTS

| | | |
|---|---|---|
| JP | 2018204373 A | 12/2018 |
| JP | 2019078099 A | 5/2019 |

* cited by examiner

*Primary Examiner* — Khoi H Tran
*Assistant Examiner* — Nhi Q Bui
(74) *Attorney, Agent, or Firm* — HAUPTMAN HAM, LLP (57) ABSTRACT

The vehicle transportation system includes an in-vehicle system mounted on the vehicle, and a vehicle transportation device capable of communicating with the in-vehicle system and capable of transporting the vehicle by autonomous travel. The vehicle transportation device is configured to transmit a confirmation signal for confirming the presence or absence of a remote operation request to the in-vehicle system at the time of transportation of the vehicle, and permit remote operation from the inside of the vehicle when a request signal for remote operation is received from the in-vehicle system.

6 Claims, 7 Drawing Sheets

VEHICLE TRANSPORTATION SYSTEM, VEHICLE TRANSPORTATION METHOD, AND STORAGE MEDIUM

CROSS-REFERENCE TO RELATED APPLICATION

This application claims priority to Japanese Patent Application No. 2022-082224 filed on May 19, 2022, incorporated herein by reference in its entirety.

BACKGROUND

1. Technical Field

The present disclosure relates to a vehicle transportation system, a vehicle transportation method, and a storage medium.

2. Description of Related Art

Japanese Unexamined Patent Application Publication No. 2018-204373 (JP 2018-204373 A) discloses a technique in which in a parking lot in which an autonomous driving vehicle and a non-autonomous driving vehicle can be parked, the non-autonomous driving vehicle is transported from an entry/exit portion to a parking slot by a self-propelled vehicle transportation device.

SUMMARY

In the future, as a vehicle transportation service, for example, it is considered to provide a service for transporting a manned vehicle that has a difficulty in traveling such as a failed vehicle to a destination by a vehicle transportation device capable of autonomous traveling. When an occupant of the vehicle cannot perform an operation or give an instruction from the inside of the vehicle to the vehicle transportation device during the vehicle transportation service, that is, while the vehicle is transported by the vehicle transportation device, the occupant of the vehicle may feel anxiety.

The present disclosure has been made in view of the above issue, and an object of the present disclosure is to suppress the occupant of the vehicle from feeling anxiety while the vehicle is transported by the vehicle transportation device.

In order to solve the above issue, a vehicle transportation system according to an aspect of the present disclosure includes
  an in-vehicle system mounted on a vehicle, and
  a vehicle transportation device configured to be able to communicate with the in-vehicle system and transport the vehicle by autonomous travel.
The vehicle transportation device is configured to
  transmit, to the in-vehicle system, a confirmation signal for confirming presence or absence of a remote operation request when the vehicle is transported, and
  permit a remote operation from inside of the vehicle when a request signal for requesting the remote operation is received from the in-vehicle system.

In order to solve the above issue, a vehicle transportation method according to an aspect of the present disclosure by a vehicle transportation device configured to be able to communicate with an in-vehicle system mounted on a vehicle and transport the vehicle by autonomous travel includes:
  transmitting, to the in-vehicle system, a confirmation signal for confirming presence or absence of a remote operation request when the vehicle is transported; and
  permitting a remote operation from inside of the vehicle when a request signal for requesting the remote operation is received from the in-vehicle system.

In order to solve the above issue, a storage medium according to an aspect of the present disclosure stores a computer program for controlling a vehicle transportation device that is able to communicate with an in-vehicle system mounted on a vehicle and transport the vehicle by autonomous travel, the computer program causing the vehicle transportation device to execute:
  transmitting, to the in-vehicle system, a confirmation signal for confirming presence or absence of a remote operation request when the vehicle is transported; and
  permitting a remote operation from inside of the vehicle when a request signal for requesting the remote operation is received from the in-vehicle system.

With these aspects according to the present disclosure, since the vehicle transportation device can be remotely operated when the vehicle is transported, it is possible to suppress the occupant of the vehicle from feeling anxiety when the vehicle is transported.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments will be described in detail with reference to the drawings. In the following description, similar components are given the same reference numbers.

Figure 1:
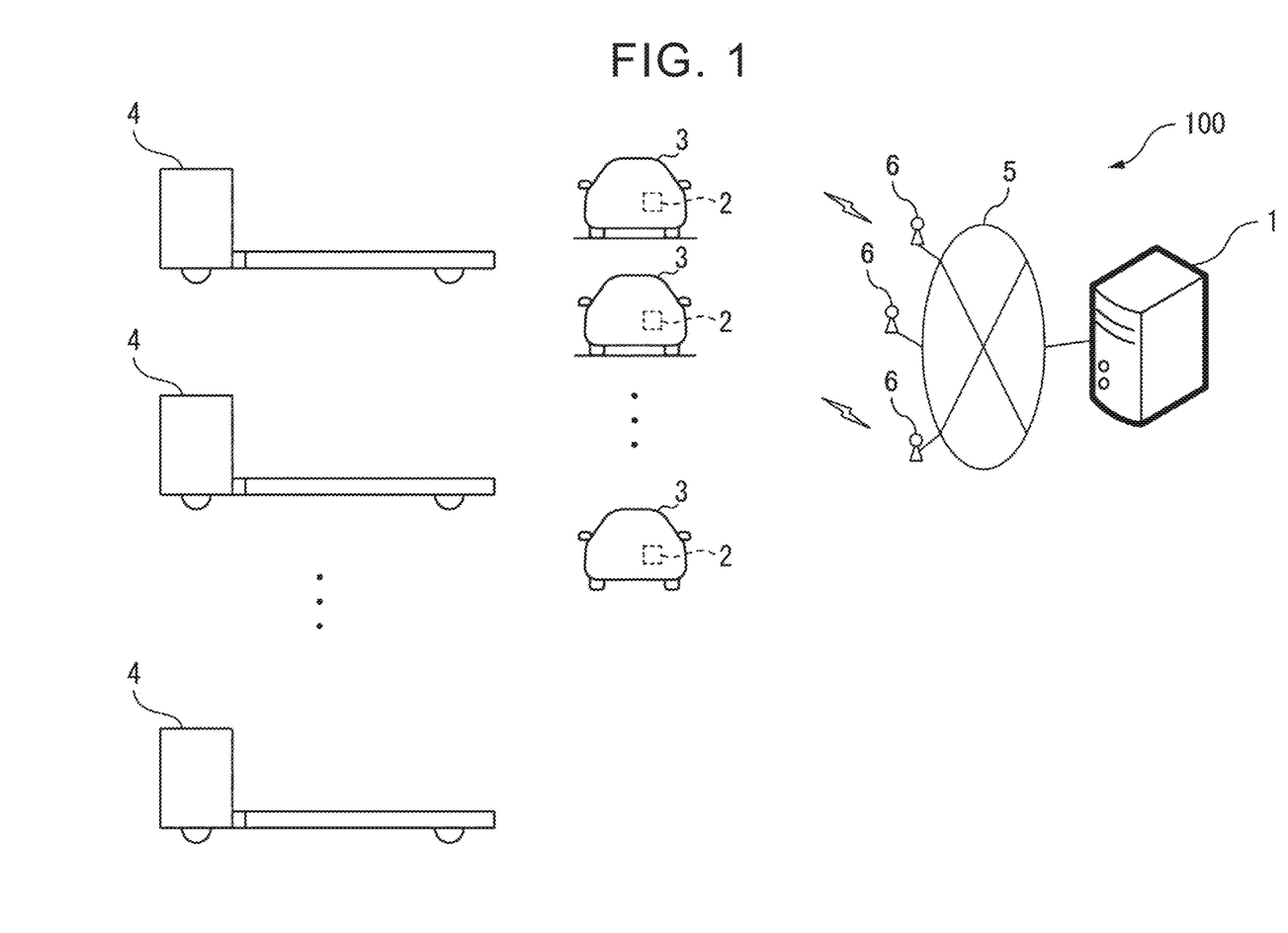
FIG. 1 is a schematic configuration diagram of a vehicle transportation system according to an embodiment of the present disclosure.

FIG. 1 is a schematic configuration diagram of a vehicle transportation system 100 according to an embodiment of the present disclosure.

As illustrated in FIG. 1, the vehicle transportation system 100 includes a server 1, a vehicle 3 of each user using a vehicle transport service, an in-vehicle system 2 mounted on the vehicle 3, and a vehicle transportation device 4 capable of autonomous traveling. The details of the vehicle transportation service provided by the vehicle transportation system 100 will be described later referring to FIGS. 2A and 2B.

The server 1, the in-vehicle system 2, and the vehicle transportation device 4 can communicate with each other via a communication network 5 constituted by an optical communication line or the like. The server 1 is connected to the communication network 5 via, for example, a gateway (not shown) or the like. The in-vehicle system 2 and the vehicle transportation device 4 are connected to the communication network 5 via, for example, the wireless base station 6.

Figure 2A:
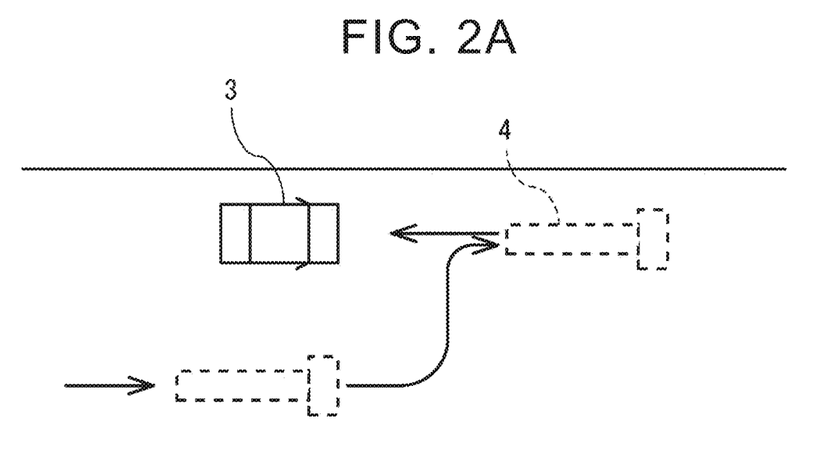
FIG. 2A is a diagram showing an example of a vehicle transportation service provided by a vehicle transportation system.
Figure 2B:
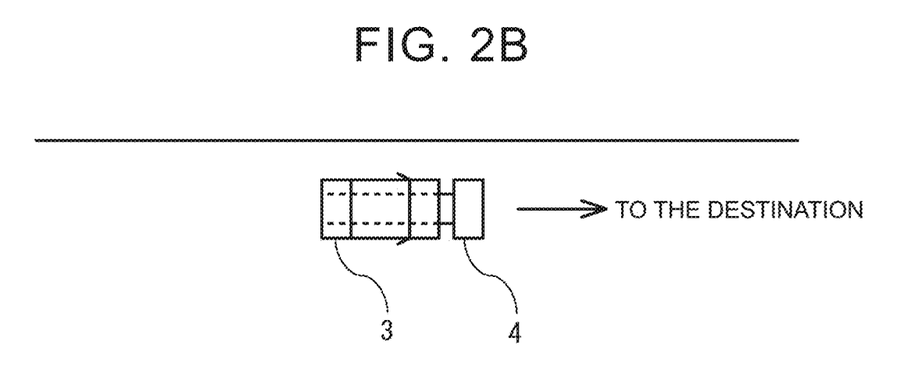
FIG. 2B is a diagram showing another example of a vehicle transportation service provided by a vehicle transportation system.

FIG. 2A is a diagram illustrating a vehicle transportation service provided by a vehicle transportation system 100. FIG. 2B is a diagram illustrating a vehicle transportation service provided by the vehicle transportation system 100.

As shown in FIG. 2A, the vehicle transportation system 100 automatically lifts up the manned vehicle 3, which has been ridden by the service user, by the vehicle transportation device 4 based on a transportation request from the user of the vehicle transportation service (hereinafter referred to as "service user"), as a vehicle transportation service. Thereafter, as shown in FIG. 2B, the vehicle transportation system 100 provides a service for transporting the vehicle to a destination. Such a vehicle transportation service can be used, for example, to convey the vehicle 3 of the service user who has failed to a destination designated by the service user. For example, the vehicle transportation system 100 may be utilized to transport the vehicle 3 of a service user that has been moved into each facility, such as an accommodation facility or a commercial facility, a public facility, a passenger facility, or a medical facility, to the parking space in the parking lot of the facility.

Here, if the occupant of the vehicle 3 cannot perform an operation or an instruction from the vehicle side with respect to the vehicle transportation device 4 during the provision of the vehicle transportation service, that is, the vehicle transportation by the vehicle transportation device 4, the occupant of the vehicle 3 may feel anxiety.

Therefore, in the present embodiment, the vehicle transportation device 4 can be remotely operated from the vehicle side during the vehicle transportation by the vehicle transportation device 4. Hereinafter, the configurations of the server 1, the in-vehicle system 2, and the vehicle transportation device 4 will be described with reference to FIGS. 3 to 7. With reference to FIG. 8, an example of a vehicle transportation process according to the present embodiment, which is performed in order to provide a vehicle transportation service in the server 1, the in-vehicle system 2, and the vehicle transportation device 4, will be described.

Figure 3:
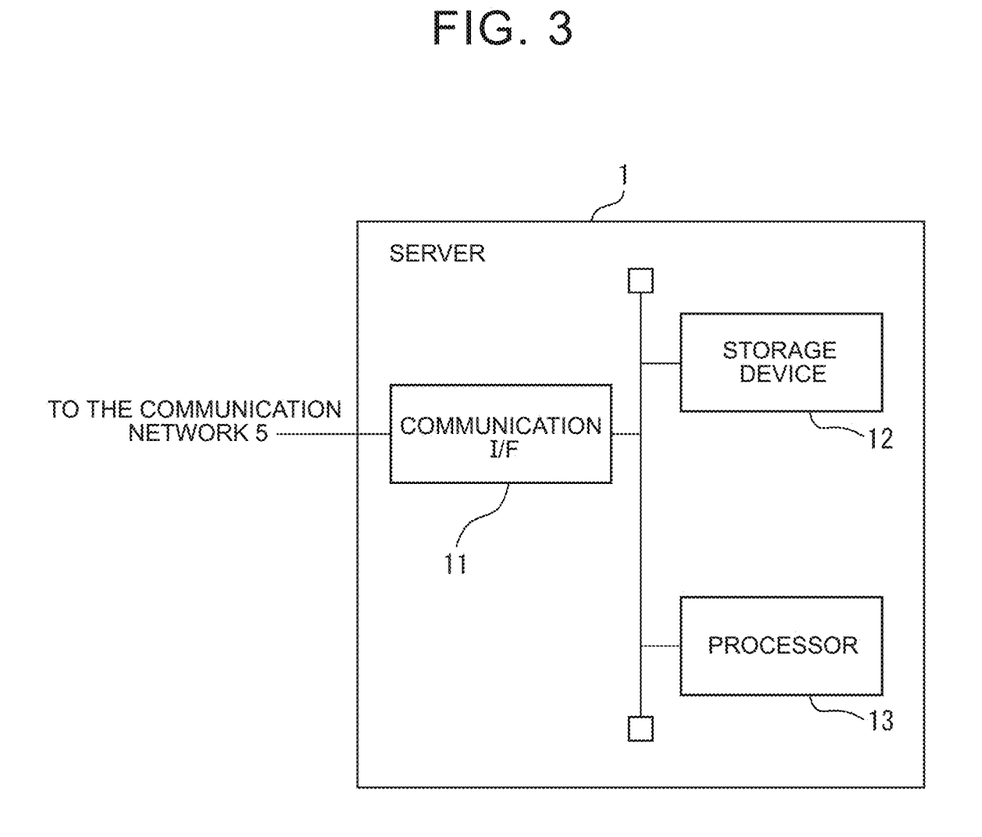
FIG. 3 is a schematic configuration diagram of a server according to an embodiment of the present disclosure.

FIG. 3 is a schematic configuration diagram of the server 1.

The server 1 includes a communication interface (a communication I/F) 11, a storage device 12, and a processor 13.

The communication interface 11 has an interface circuit for connecting the server 1 to the communication network 5 (see FIG. 1). The server 1 communicates with each of the in-vehicle system 2 and the vehicle transportation device 4 via the communication interface 11 and the communication network 5.

The storage device 12 includes a storage medium such as a Hard Disk Drive (HDD), Solid State Drive (SSD), an optical recording medium, and a semiconductor memory. The storage device 12 stores various computer programs executed by the processor 13. The storage device 12 stores various types of data used when the computer program is executed.

In the present embodiment, the storage device 12 stores, for example, the identification information of each in-vehicle system 2, the identification information and the current position information of the vehicle 3 on which the in-vehicle system 2 is mounted, the identification information and the current position information of each vehicle transportation device 4, and the current position information as data used when the computer program is executed. The identification information of the in-vehicle system 2 may be, for example, a MAC address. The identification information of each vehicle 3 can be, for example, the vehicle number of each vehicle 3. The identification information of each vehicle transportation device 4 can be, for example, a vehicle number or a cart number of each vehicle transportation device 4.

The processor 13 includes one or more Central Processing Unit (CPU) and peripheral circuitry thereof. The processor may further include other arithmetic circuits such as a logical arithmetic unit and a numerical arithmetic unit. The processor executes various computer programs stored in the storage device 12. The processor 13 performs, for example, a process related to the server 1 in the vehicle transportation process.

Figure 4:
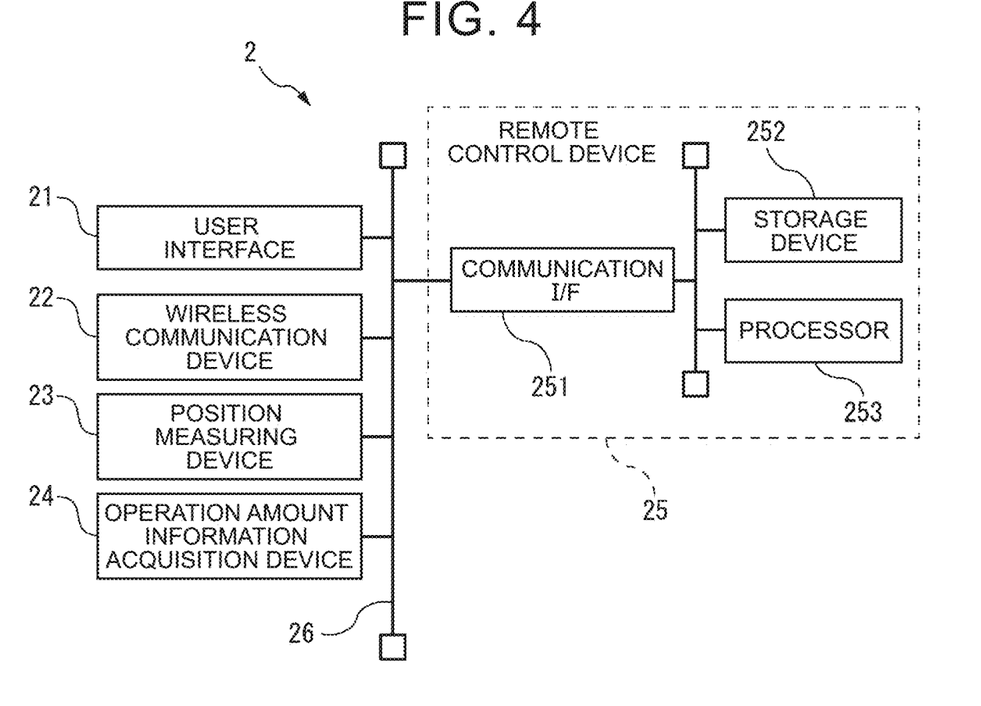
FIG. 4 is a schematic configuration diagram of an in-vehicle system according to an embodiment of the present disclosure.

FIG. 4 is a schematic configuration diagram of the in-vehicle system 2.

The in-vehicle system 2 includes a user interface 21, a wireless communication device 22, a position measuring device 23, an operation amount information acquisition device 24, and a remote control device 25. The user interface 21, the wireless communication device 22, the position measuring device 23, and the operation amount information acquisition device 24 are connected to the remote control device 25 via an in-vehicle network 26 compliant with standards such as CAN.

The user interface 21 is, for example, a terminal (in-vehicle terminal) mounted in advance in the vehicle 3 such as a Human Machine Interface (HMI) capable of inputting and outputting data. The user interface 21 generates a signal corresponding to various input operations performed by a user (service user). The user interface 21 transmits the signal to the remote control device 25. The user interface 21 also displays various types of information for display received from the remote control device 25. The service user can make a transportation request for the vehicle 3 to the server 1, a remote operation request for the vehicle transportation device 4, and the like via the user interface 21.

The user interface 21 may be, for example, a mobile terminal carried by a service user such as a mobile phone or a tablet computer. In this case, the communication between the user interface 21 and the other devices of the in-vehicle system 2 can be performed by wireless communication.

The wireless communication device 22 includes, for example, an antenna and a signal processing circuit that executes various processes related to wireless communication, such as modulation and demodulation of a wireless signal. Wireless communication device 22, the communication network 5 (see FIG. 1) by accessing the wireless base station 6 which is connected via a gateway (not shown) or the like (see FIG. 1), is connected to the communication network 5 via the wireless base station 6.

The position measuring device 23 includes, for example, a receiver that receives a Global Navigation Satellite System (GNSS) signal and an arithmetic circuit that calculates the position of the vehicle 3 from GNSS signal. The position measuring device 23 measures the position of the vehicle 3 based on GNSS signal, and transmits the position to the remote control device 25 every time the position of the vehicle 3 is measured.

The operation amount information acquisition device 24 acquires an operation amount of each driving operation related to acceleration, steering, and braking of the vehicle 3, and transmits the acquired driving operation amount to the remote control device 25. The operation amount of the driving operation related to the acceleration is, for example, the depression amount of the accelerator pedal. The operation amount of the driving operation related to the steering is, for example, a steering angle of the steering wheel. The operation amount of the driving operation related to the braking is, for example, a depression amount of the brake pedal.

The remote control device 25 includes a communication interface 251, a storage device 252, and a processor 253.

The communication interface 251 includes interface circuitry for connecting the remote control device 25 to the in-vehicle network 26.

The storage device 252 includes, for example, a storage medium such as an HDD, an SSD, an optical recording medium, or a semiconductor memory. The storage device 252 stores various computer programs executed on the processor 253 and various kinds of data.

The processor 253 includes one or more CPU and peripheral circuitry thereof. The processor 253 may further include other arithmetic circuits such as a logical arithmetic unit and a numerical arithmetic unit. The processor 253 executes various computer programs stored in the storage device 252. The processor 253 performs, for example, a process related to the in-vehicle system 2 among the vehicle transportation processes.

Next, the vehicle transportation device 4 will be described in detail with reference to FIG. 5 to FIG. 7.

Figure 5:
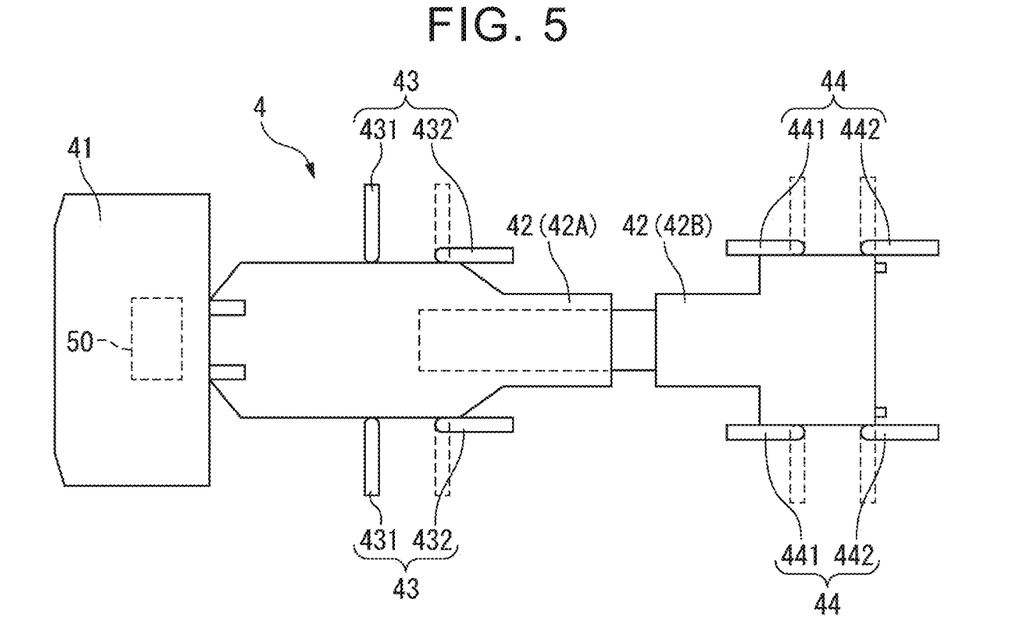
FIG. 5 is a schematic top view of a vehicle transportation device according to an embodiment of the present disclosure.

FIG. 5 is a schematic top view of the vehicle transportation device 4. FIG. 6A is a schematic side view of a vehicle transportation device in a state in which the carriage portion 42 of the vehicle transportation device 4 is not lifted up (hereinafter, referred to as "non-lifted up state"). FIG. 6B is a schematic side view of a vehicle transportation device 4 in a state in which a carriage portion 42 of the vehicle transportation device 4 is lifted up (hereinafter referred to as a "lifted-up state").

Figure 6A:
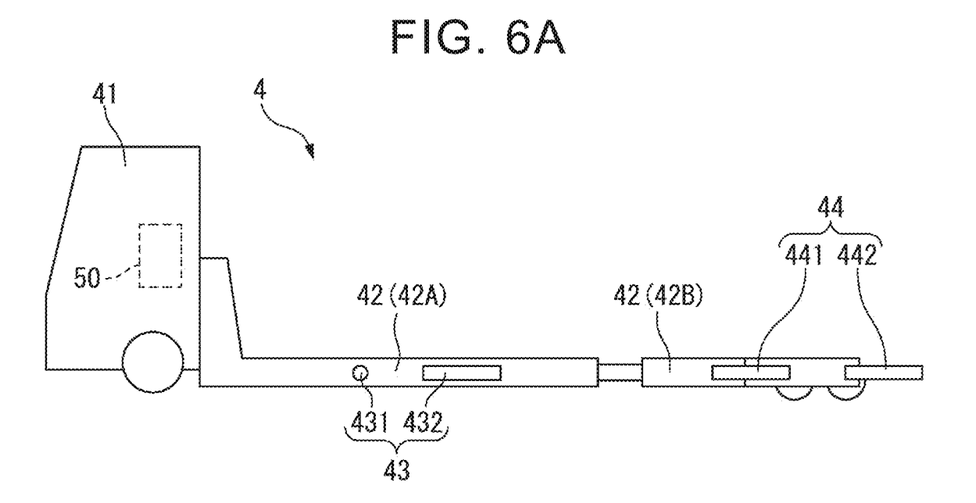
FIG. 6A is a schematic side view of a vehicle transportation device in which a carriage portion is not lifted up.
Figure 6B:
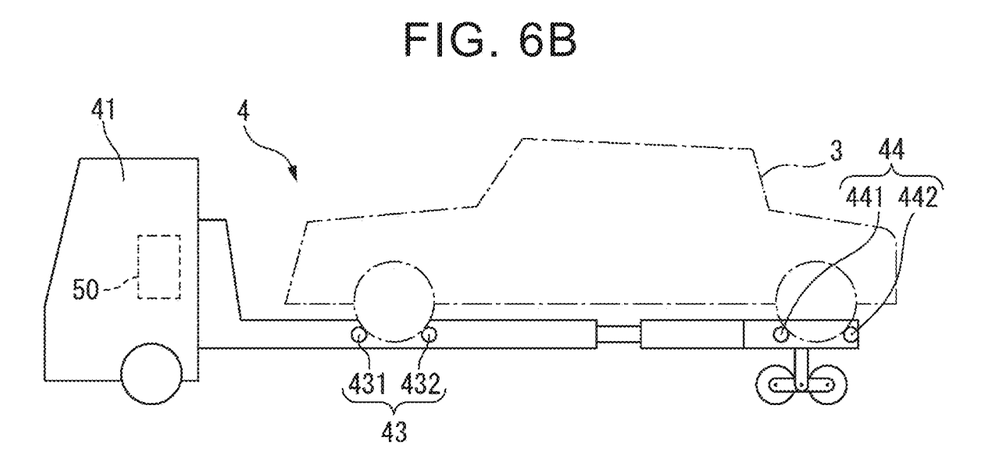
FIG. 6B is a schematic side view of a vehicle transportation device with a carriage portion lifted up.

As illustrated in FIGS. 5 to 6B, the vehicle transportation device 4 includes a traction portion 41 that autonomously travels and a carriage portion 42 that is towed by the traction portion and supports the vehicle 3.

The traction portion 41 is equipped with an autonomous traveling system 50, and the autonomous traveling system 50 automatically performs driving operations related to acceleration, steering, and braking, and transportation work of the vehicle 3. Details of the autonomous traveling system 50 will be described later with reference to FIG. 7.

The carriage portion 42 is moved up and down in the vertical direction with respect to the traction portion 41 by an elevating actuator (not shown). The carriage portion 42 may be switched to a non-lift-up state or a lift-up state. The type and structure of the lifting actuator are not particularly limited, and may be, for example, an electric, hydraulic, or pneumatic linear actuator.

The carriage portion 42 includes a first carriage portion 42A on the traction portion 41 side, and a second carriage portion 42B configured to be extendable and retractable in the front-rear direction of the carriage portion 42 with respect to the first carriage portion 42A by an extendable actuator (not shown). The first carriage portion 42A is provided with a first wheel support arm 43 that supports one of the front wheels or the rear wheels of the vehicle 3, and the second carriage portion 42B is provided with a second wheel support arm 44 that supports the other of the front wheels or the rear wheels of the vehicle.

The first wheel support arm 43 includes a fixed arm 431 that extends in the left-right direction of the carriage portion 42. The first wheel support arm 43 comprises a movable arm 432 that can be pivoted by a pivot actuator (not shown) between a retracted position, shown in solid lines in FIG. 5, and a deployed position, shown in dashed lines. The second wheel support arm 44 includes a pair of movable arms 441,442 that can be pivoted by a pivot actuator (not shown) between a retracted position, shown in solid lines in FIG. 5, and a deployed position, shown in dashed lines.

When the vehicle 3 is lifted up, the carriage portion 42 is inserted into a space between the bottom surface of the vehicle 3 and the ground from the front side or the rear side of the vehicle 3 in a non-lifted state. Then, the second carriage portion 42B is extended and contracted in accordance with the wheel base of the vehicle 3, and the movable arms 432,441,442 of the first wheel support arm 43 and the second wheel support arm 44 are rotated to the deployed position, whereby the front wheels and the rear wheels of the vehicle 3 are respectively sandwiched. Thereafter, the carriage portion 42 is switched to the lift-up state to support the vehicle 3.

Figure 7:
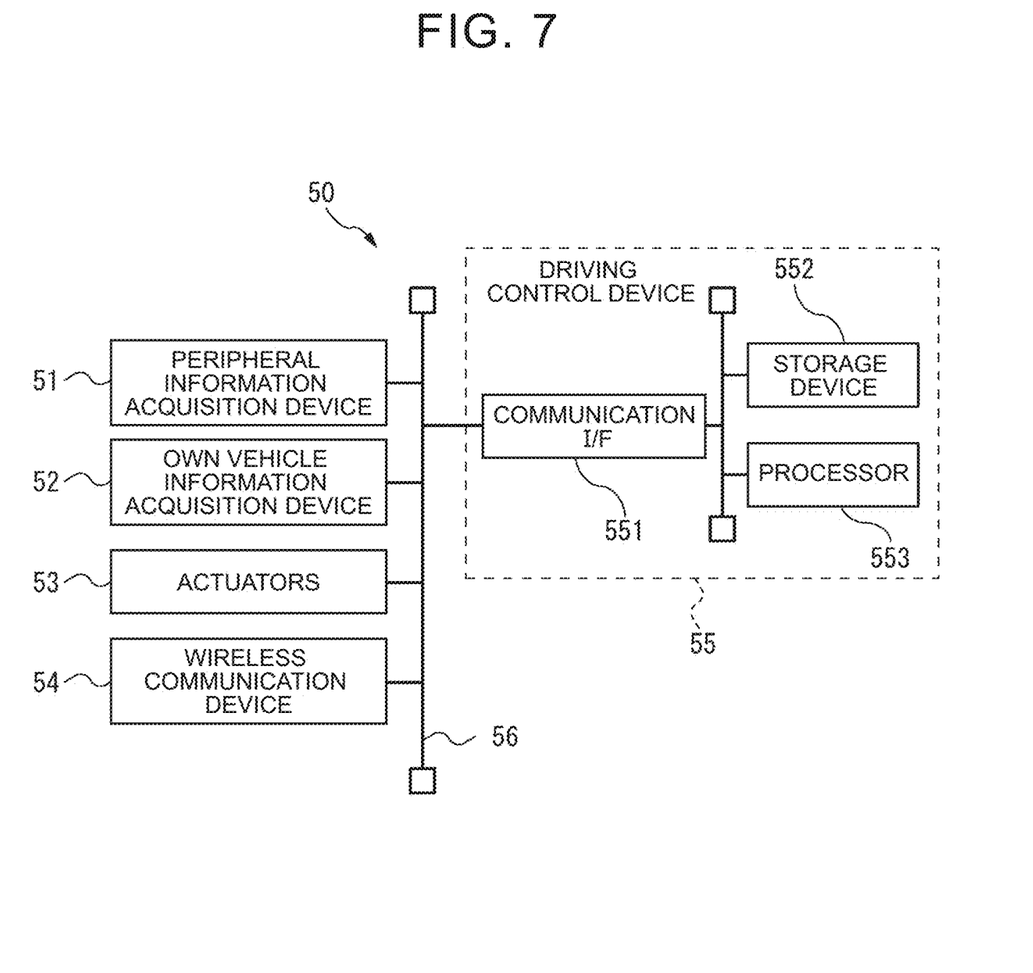
FIG. 7 is a schematic configuration diagram of an autonomous traveling system mounted on a vehicle transportation device.
Figure 8:
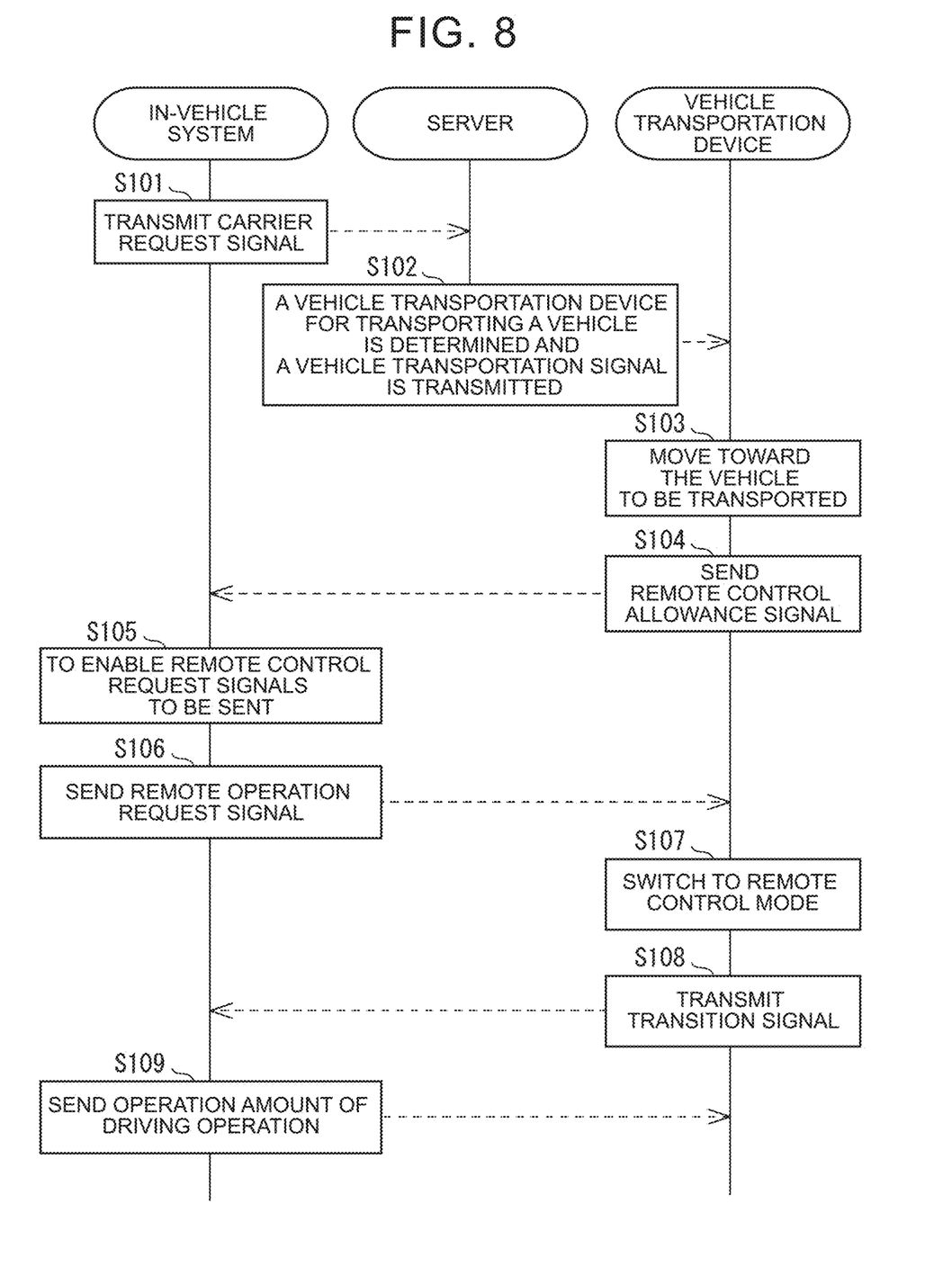
FIG. 8 is an operation sequence diagram for explaining the contents of a vehicle transportation process according to an embodiment of the present disclosure, which is implemented in a server, an in-vehicle system, and a vehicle transportation device.

FIG. 7 is a schematic configuration diagram of an autonomous traveling system 50 mounted on the vehicle transportation device 4.

The autonomous traveling system 50 includes a peripheral information acquisition device 51, an own vehicle information acquisition device 52, various actuators 53, a wireless communication device 54, and a driving control device 55. The peripheral information acquisition device 51, the own vehicle information acquisition device 52, the various actuators 53, and the wireless communication device 54 are connected to the driving control device 55 via a network 56 in the vehicle transportation device 4 conforming to standards such as CAN.

The peripheral information acquisition device 51 is a device for acquiring data of an object around the vehicle transportation device 4 as peripheral information of the vehicle transportation device 4. The objects around the vehicle transportation device 4 are, for example, surrounding vehicles including a vehicle to be conveyed, pedestrians, obstacles such as roads and buildings, and the like. Examples of the peripheral-information acquisition device 51 include a camera that photographs an object around the vehicle transportation device, a Light Detection and Ranging (LiDAR) that measures a distance to an object around the vehicle transportation device, and a ranging sensor such as a millimeter-wave radar sensor. The peripheral information acquisition device 51 is not limited to these devices, and may include a plurality of devices such as a camera and a distance measurement sensor. The peripheral information of the vehicle transportation device 4 acquired by the peripheral information acquisition device 51 is transmitted to the driving control device 55.

The own vehicle information acquisition device 52 is a device for acquiring various types of data related to the state of the vehicle transportation device 4 as the own-vehicle information of the vehicle transportation device 4. The own vehicle information acquisition device 52 according to the present embodiment includes various sensors for detecting the velocity, the attitude, and the like of the vehicle transportation device 4, various sensors for detecting the condition of the carriage portion 42, a GNSS receiver for detecting the present position of the vehicle transportation device 4, and the like. The state of the carriage portion 42 is an elevated state of the carriage portion 42, a position of each of the wheel support arms 43 and 44, and the like. The own vehicle information of the vehicle transportation device 4 acquired by the own vehicle information acquisition device 52 is transmitted to the driving control device 55.

The various actuators 53 are actuators whose operation is controlled by the driving control device 55. The various actuators 53 are, for example, a drive actuator such as an engine or a motor for generating power for driving the traction portion 41, a steering actuator for controlling a traveling direction of the traction portion 41, a braking actuator for braking the traction portion 41, the above-described elevating actuator for performing elevating and lowering control of the carriage portion 42, and the above-described telescopic actuator for performing expansion and contraction control of the carriage portion 42.

The wireless communication device 54 includes, for example, an antenna and a signal processing circuit that executes various processes related to wireless communication such as modulation and demodulation of a wireless signal. Wireless communication device 54, the communication network 5 (see FIG. 1) by accessing the wireless base station 6 which is connected via a gateway (not shown) or the like (see FIG. 1), is connected to the communication network 5 via the wireless base station 6. As a result, communication is performed between the vehicle transportation device 4, the server 1, and the in-vehicle system 2.

The driving control device 55 includes a communication interface 551, a storage device 552, and a processor 553.

The communication interface 551 includes an interface circuit for connecting the driving control device 55 to the network 56 in the vehicle transportation device 4. That is, the interface 71 is connected to the peripheral information acquisition device 51 and the like via the network 56 in the vehicle transportation device 4.

The storage device 552 includes a storage medium such as an HDD, an SSD, an optical recording medium, and a semiconductor memory. The storage device stores various computer programs executed by the processor 553. The storage device 552 stores various types of data used when the computer program is executed. Further, the storage device 552 stores detailed map information of an area in which the vehicle transportation device 4 is used.

The processor 553 includes one or more Central Processing Unit (CPU) and peripheral circuitry thereof. The processor 553 may further include other arithmetic circuits such as a logical arithmetic unit and a numerical arithmetic unit. The processor 553 executes various kinds of computer programs stored in the storage device 552 and comprehensively controls the overall operation of the vehicle transportation device 4. For example, the processor 553 controls various types of actuators 53 based on the peripheral information, the own vehicle information, the map information, and the like of the vehicle transportation device 4. Thus, the driving operation of the vehicle transportation device 4 and the transportation work of the vehicle 3 are automatically performed. The processor 553 performs, for example, a process related to the vehicle transportation device 4 in the vehicle transportation process.

FIG. 8 is an operation sequence diagram for explaining the contents of the vehicle transportation processing (computer program) according to the present embodiment, which is implemented in the server 1, the in-vehicle system 2, and the vehicle transportation device 4.

In S101 of steps, the remote control device 25 of the in-vehicle system 2 transmits, to the server 1, a transportation request signal indicating that the transportation request of the vehicle 3 has been made, when the transportation request of the vehicle 3 is made by the service user via the user interface 21.

The transportation request signal includes, for example, identification information of the in-vehicle system 2 that is a transmission source of the signal, identification information of the vehicle 3 on which the in-vehicle system 2 is mounted, that is, the vehicle 3 that is a transportation target (hereinafter, referred to as "transportation target vehicle 3"), and current position information.

In the step S102, the server 1 receives the transportation request signal, and determines the vehicle transportation device 4 that performs the vehicle transportation on the basis of, for example, the current position information of the transportation target vehicle 3 and the current position information and the usage status of the vehicle transportation device 4. The server 1 transmits a vehicle transportation signal to the determined vehicle transportation device 4. The vehicle transportation signal includes, for example, identification information of the in-vehicle system 2, identification information of the transportation target vehicle 3, and current position information. It is assumed that the vehicle transportation device 4 periodically transmits the current position information and the usage status of the own device to the server 1.

In the step S103, when receiving the vehicle transportation signal, the driving control device 55 of the vehicle transportation device 4 moves the vehicle transportation device 4 to the transportation target vehicle 3 by autonomous travel based on the present position information of the transportation target vehicle 3.

In the step S104, the driving control device 55 of the vehicle transportation device 4 transmits a remote operation acceptance signal indicating that the in-vehicle system 2 can be remotely operated, for example, when the vehicle arrives at the source of the transportation target vehicle 3 and the lift-up operation of the transportation target vehicle 3 is completed. Note that the timing at which the remote control acceptance signal is transmitted is not limited to the above-described timing. The timing at which the remote control permission signal is transmitted may be appropriately transmitted at an appropriate timing, such as, for example, a timing at which the remote control permission signal arrives at the source of the transportation target vehicle 3 and the transportation target vehicle 3 is confirmed by the peripheral information acquisition device 51.

In S105 of steps, the remote control device 25 of the in-vehicle system 2, upon receiving the remote control acceptance signal, informs the service-user via the user interface 21 that the vehicle transportation device 4 can be remotely operated from the vehicle. At the same time, the remote control device 25 enables the service user to transmit, via the user interface 21, a request signal for requesting remote control to the vehicle transportation device 4.

In the step S106, the remote control device 25 of the in-vehicle system 2 transmits a remote operation request signal to the vehicle transportation device 4, which is a source of the remote control acceptance signal, when the service user inputs an operation request from the vehicle to the vehicle transportation device 4 via the user interface 21.

In step 107, upon receiving the remote operation request signal, the driving control device 55 of the vehicle transportation device 4 permits remote operation from the transportation target vehicle 3, and shifts to the remote operation mode. The remote operation mode is acquired by the operation amount information acquisition device 24 of the in-vehicle system 2. The remote control mode is a mode in which the operation amount of each driving operation related to acceleration, steering, and braking performed in the vehicle 3 transmitted from the wireless communication device 22 of the in-vehicle system 2 is reflected in the driving operation of the own device and traveled.

In the present embodiment, the operation amount of each driving operation related to acceleration, steering, and braking performed in the vehicle 3 is reflected in the driving operation of the vehicle transportation device 4. However, it is not always necessary to reflect the operation amount of all of these driving operations, and one or two of them may be selectively reflected.

In a case where the remote operation request signal is not received even after a predetermined time has elapsed after the transmission of the remote control acceptance signal, the driving control device 55 of the vehicle transportation device 4 considers that there is no remote operation request and starts autonomous traveling.

In the step-wise S108, the driving control device 55 of the vehicle transportation device 4 transmits a transition signal for notifying the service-user that the service-user has shifted to the remote control mode to the in-vehicle system 2.

In S109 of steps, the remote control device 25 of the in-vehicle system 2, upon receiving the transition signal, informs the service-user via the user interface 21 that the remote control of the vehicle transportation device 4 is ready. At the same time, the remote control device 25 starts transmitting the operation amount of each driving operation acquired by the operation amount information acquisition device 24 to the vehicle transportation device 4. Thus, the operation amounts of the respective driving operations related to the acceleration, the steering, and the braking performed in the vehicle 3 being conveyed by the vehicle transportation device 4 are reflected in the driving operation of the vehicle transportation device 4, so that the vehicle transportation device 4 can be remotely operated from the inside of the vehicle 3.

The vehicle transportation system 100 according to the present embodiment described above includes the in-vehicle system 2 mounted on the vehicle 3, and the vehicle transportation device 4 configured to be capable of communicating with the in-vehicle system 2 and capable of transporting the vehicle 3 by autonomous travel. Then, the vehicle transportation device 4 is configured to transmit a remote control acceptance signal (confirmation signal) for confirming the presence or absence of a remote operation request to the in-vehicle system 2 when the vehicle 3 is transported, and to permit remote control from the inside of the vehicle 3 when a remote control request signal desiring remote control is received from the in-vehicle system 2.

Accordingly, since the vehicle transportation device 4 can be remotely operated when the vehicle 3 is transported, it is possible to suppress the occupant of the vehicle 3 from feeling anxiety when the vehicle 3 is transported.

When the remote control is permitted, the vehicle transportation device 4 is configured to reflect a driving operation related to at least one of acceleration, steering, and braking performed in the vehicle 3 in the driving operation of the own device. More specifically, the in-vehicle system 2 is configured to transmit the operation amount related to the driving operation performed in the vehicle 3 to the vehicle transportation device 4. The vehicle transportation device 4 is configured to perform a driving operation based on an operation amount received from the in-vehicle system 2.

Thus, the vehicle transportation device 4 can be remotely operated from the inside of the vehicle 3 by reflecting the operation amounts of the respective driving operations related to acceleration, steering, and braking performed in the vehicle 3 being conveyed by the vehicle transportation device 4 in the driving operation of the vehicle transportation device 4. Further, in this manner, since the operation amount of each driving operation related to acceleration, steering, and braking performed in the vehicle 3 is reflected, the remote driving operation of the vehicle transportation device 4 can be easily performed.

The in-vehicle system 2 according to the present embodiment includes a user interface 21 (terminal) capable of inputting and outputting information, a wireless communication device 22 (communication device) communicating with the vehicle transportation device 4, and a remote control device 25 (control device). The remote control device 25 is configured to output, upon receiving the remote operation acceptance signal (confirmation signal) via the wireless communication device 22, information for confirming the presence or absence of the remote operation request of the vehicle transportation device 4 to the user interface 21.

The in-vehicle system 2 further includes an operation amount information acquisition device 24 that acquires an operation amount related to at least one driving operation of acceleration, steering, or braking performed in the vehicle 3. The remote control device 25 is configured to start transmission of the operation amount related to the driving operation acquired by the operation amount information acquisition device 24 to the vehicle transportation device 4 when the information requesting the remote operation of the vehicle transportation device 4 is input via the user interface 21.

Although the embodiment of the present disclosure has been described above, the above embodiment shows only a part of the application examples of the present disclosure, and the technical scope of the present disclosure is not limited to the specific configuration of the above embodiment.

For example, in the above-described embodiment, the transmission and reception of the information between the in-vehicle system 2 and the vehicle transportation device 4 of the remote control permission signal, the remote operation request signal, and the operation amount of each driving operation are directly performed, but the information may be indirectly performed via the server 1.

In addition, in the above-described embodiment, the operation amount of each driving operation related to acceleration, steering, and braking performed in the vehicle 3 can basically be an operation amount when an actual machine such as an accelerator pedal, a steering wheel, or a brake pedal of the vehicle 3 is operated. However, the operation amount of each driving operation related to acceleration, steering, and braking performed in the vehicle 3 is not limited to this, and for example, the operation amount of each driving operation may be input by the user interface 21. In this case, the user interface 21 functions as the operation amount information acquisition device 24.

In addition, in the above-described embodiment, the computer program executed in the remote control device 25 of the server 1 or the in-vehicle system, and the driving control device 55 of the vehicle transportation device 4 may be provided in a form recorded in a computer-readable portable recording medium such as a semiconductor memory, a magnetic recording medium, or an optical recording medium.

What is claimed is:

1. A vehicle transportation system comprising:
   an in-vehicle system mounted on a vehicle; and
   a vehicle transporter configured to be able to communicate with the in-vehicle system and transport the vehicle by autonomous travel, wherein the vehicle transporter is configured to:
   transmit, to the in-vehicle system, a confirmation signal for confirming presence or absence of a remote operation request when the vehicle is transported; and
   permit a remote operation from inside of the vehicle when a request signal for requesting the remote operation is received from the in-vehicle system, wherein
   the in-vehicle system includes:
      a terminal to which information is able to be input and output;
      an antenna for communicating with the vehicle transporter; and
      a processor configured to output information for confirming the presence or absence of the remote operation request of the vehicle transporter to the terminal upon receiving the confirmation signal via the antenna.

2. The vehicle transportation system according to claim 1, wherein the vehicle transporter is configured to reflect a driving operation related to at least one of acceleration, steering, and braking performed in the vehicle to a driving operation of the vehicle transporter when the remote operation is permitted.

3. The vehicle transportation system according to claim 2, wherein:
   the in-vehicle system is configured to transmit an operation amount of the driving operation performed in the vehicle to the vehicle transporter; and
   the vehicle transporter performs the driving operation based on the operation amount received from the in-vehicle system.

4. The vehicle transportation system according to claim 1, wherein:
   the in-vehicle system further includes an operation amount information acquisition device for acquiring an operation amount related to at least one driving operation of acceleration, steering, and braking performed in the vehicle; and
   the processor is configured to start transmission of the operation amount related to the driving operation acquired by the operation amount information acquisition device to the vehicle transporter when information requesting a remote operation of the vehicle transporter is input via the terminal.

5. A vehicle transportation method by a vehicle transporter configured to be able to communicate with an in-vehicle system mounted on a vehicle and transport the vehicle by autonomous travel, the vehicle transportation method comprising:
   transmitting, to the in-vehicle system, a confirmation signal for confirming presence or absence of a remote operation request when the vehicle is transported; and
   permitting a remote operation from inside of the vehicle when a request signal for requesting the remote operation is received from the in-vehicle system, wherein
   the in-vehicle system includes:
      a terminal to which information is able to be input and output;
      an antenna for communicating with the vehicle transporter; and
      a processor configured to output information for confirming the presence or absence of the remote operation request of the vehicle transporter to the terminal upon receiving the confirmation signal via the antenna.

6. A non-transitory storage medium storing a computer program for controlling a vehicle transporter that is able to communicate with an in-vehicle system mounted on a vehicle and transport the vehicle by autonomous travel, the computer program causing the vehicle transporter to execute:
   transmitting, to the in-vehicle system, a confirmation signal for confirming presence or absence of a remote operation request when the vehicle is transported; and
   permitting a remote operation from inside of the vehicle when a request signal for requesting the remote operation is received from the in-vehicle system, wherein
   the in-vehicle system includes:
      a terminal to which information is able to be input and output;
      an antenna for communicating with the vehicle transporter; and
      a processor configured to output information for confirming the presence or absence of the remote operation request of the vehicle transporter to the terminal upon receiving the confirmation signal via the antenna.

* * * * *